March 28, 1961 S. PRIGOZY 2,976,727
LIQUID QUANTITY GAUGE AND REPEATER SYSTEM
Filed Sept. 5, 1958
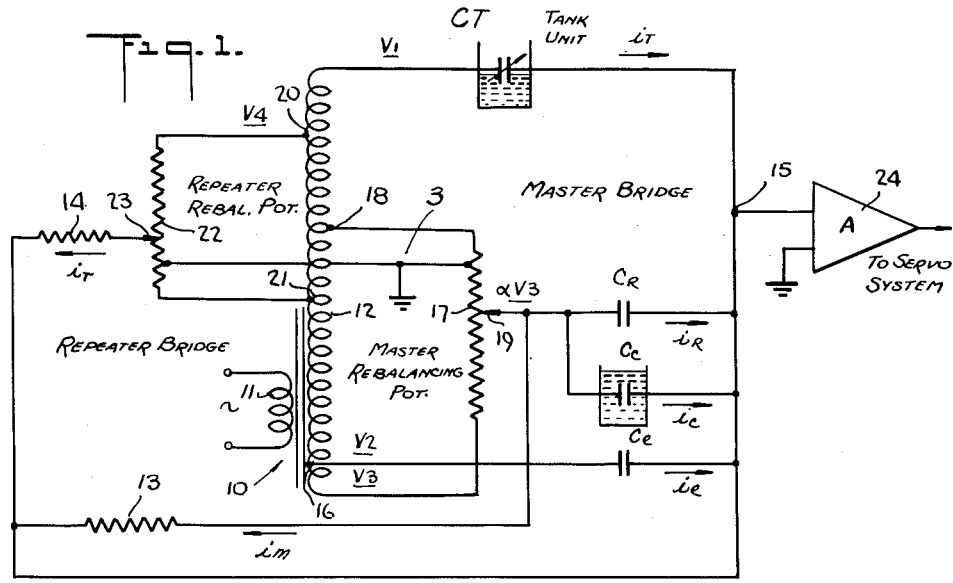
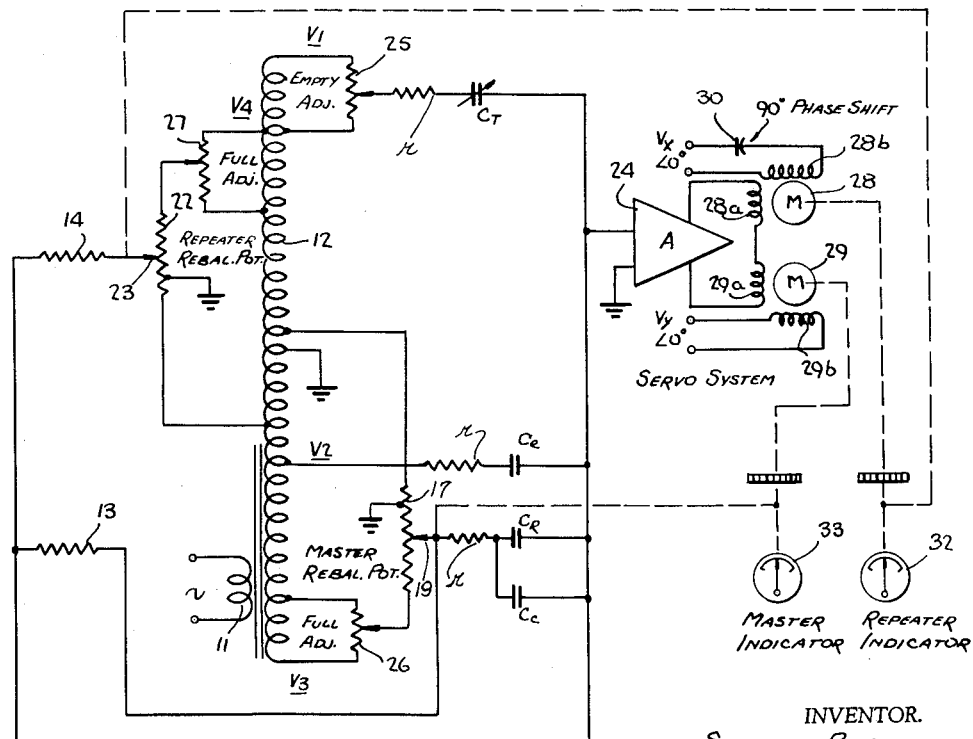
INVENTOR.
STEPHEN PRIGOZY
BY
Kenyon & Kenyon
ATTORNEYS United States Patent Office 2,976,727
Patented Mar. 28, 1961

2,976,727
LIQUID QUANTITY GAUGE AND REPEATER SYSTEM

Stephen Prigozy, New York, N.Y., assignor to Simmonds Aerocessories, Inc., Tarrytown, N.Y., a corporation of New York Filed Sept. 5, 1958, Ser. No. 759,279

7 Claims. (Cl. 73—304)

The present invention relates generally to liquid quantity systems, and more particularly to a fuel or oil gauge of the capacitive type adapted to provide accurate liquid quantity readings at more than one location remote from the tank.

In measuring the level or weight of liquid contained in a tank it is known to make use of a sensing capacitor having spaced electrodes immersed in the tank, the liquid to be measured occupying the electric field space between electrodes to an extent depending on the amount of liquid present. Since the dielectric constant of the liquid is greater than that of air, the capacitance of the tank unit will vary as a function of liquid level.

In aircraft installations or in other tank-carrying devices, it is desirable that the quantity of liquid available in the tank be indicated at more than one location in the installation. With existing systems employing capacitive type sensitive units, in order to afford readings at two distinct locations there must be a duplication of the usual tank units, bridge circuits, amplifiers and servo mechanisms. The use of duplicate capacitive liquid level sensing units in a single tank gives rise to errors by reason of interelectrode effects between the two units. Moreover, the need for a duplicated arrangement of this type substantially increases the cost of the fuel indicator system and adds materially to the weight and space requirement for the gauge.

In view of the foregoing, it is the principal object of the present invention to provide simultaneous fuel gauge readings at two or more locations remote from the tank by the use of a single tank unit in combination with a bridge circuit and amplifier.

Also an object of the invention is to obtain accurate repeater indications using a single transformer in a self-balancing dual bridge circuit, and a single amplifier whose output is fed to a pair of phase-sensitive servo motors, one of which drives a master indicator and the other a repeater indicator. A significant feature of the invention is the use of phase-sensitive servo motors which respond to the real and imaginary components of the bridge output signal, respectively, to operate master and repeater indicators.

Yet another object of the invention is to provide a single amplifier gauge and repeater system of simple, efficient and reliable design which may be manufactured at relatively low cost.

For a better understanding of the invention as well as other objects and further features thereof, reference is had to the following detailed description to be read in conjunction with the accompanying drawing, wherein like components in the various views are identified by like reference numerals.

In the drawings:

Fig. 1 is a schematic diagram of the basic bridge circuit in accordance with the invention.

Fig. 2 shows schematically the complete gauge and repeater system including the servo system for the respective indicators.

*The basic bridge circuit*

Referring now to the drawing and more particularly to Fig. 1, there is shown the basic dual bridge circuit in accordance with the invention, the circuit comprising a single-phase transformer 10, having a primary winding 11 and a center-tapped secondary 12, the center tap being grounded. In the master bridge section of the circuit there is included a tank unit capacitor $C_T$, an empty balance capacitor $C_e$, a dry reference capacitor $C_R$ and a wet compensator capacitor $C_c$. In the repeater bridge section there is included a pair of matched precision resistors 13 and 14.

Tank unit capacitor $C_T$ is normally immersed in the liquid being gauged and is preferably constituted by two concentrically arranged tubes. Since most liquids have a dielectric constant greater than unity or that of air, the capacitance of the tank unit will change with each increment of liquid added to or withdrawn from the tank. The electrode of the tank unit may be profiled to provide linear readings.

A single-phase alternating voltage is applied to primary winding 11, whereby produced in the upper section of the secondary 12 is a voltage $V_1$ and produced in the lower section of the secondary is a voltage $V_3$ which is 180° out of phase with voltage $V_1$.

Tank unit $C_T$ is connected in the upper branch of the bridge circuit between the top end of secondary 12 and a node terminal 15 to produce a variable current $i_T$ which is a function of the height of fluid in the tank unit, the phase of this current being determined by voltage $V_1$. The current $i_T$ is balanced by a current of opposing phase in the lower branch of the bridge including capacitors $C_R$, $C_c$, and $C_e$. The arrangement is such as to effect compensation for variations in the ratio of dielectric constant in the density of fluids, this being accomplished in a manner more fully described in patent application Serial No. 187,948, filed October 2, 1950.

A voltage $V_2$ is obtained from a tap 16 in the lower half of secondary 12, voltage $V_2$ having the same phase as voltage $V_3$ and being, therefore, in phase opposition to voltage $V_1$. Voltage $V_2$ is applied through the fixed capacitor $C_e$ to the node terminal 15 to produce a current $i_e$ which has a value equal to current $i_T$ when the tank unit $C_T$ is empty.

The lower end of the secondary 12 is connected to one end of a master bridge-balancing potentiometer 17, the other end of the potentiometer being connected to a tap 18 on the upper section of secondary 12 adjacent the center of this winding, the center tap being connected to an upper point on potentiometer 17 whereby effectively established across the potentiometer is the voltage $V_3$. The wiper arm 19 of the potentiometer 17 is connected through dry reference capacitor $C_R$ to node terminal 15, so that a current $i_R$ is caused to flow therethrough.

Shunted across capacitor $C_R$ is the compensating capacitor $C_c$, this capacitor being fully submerged in the liquid being tested or in a representative sample thereof whereby its capacitive value is determined by the dielectric properties of the liquid but does not change with liquid level in the tank. The value of current flow in capacitor $C_c$ is represented by $i_c$. The dry reference capacitor $C_R$ structurally corresponds to compensating capacitor $C_c$ except that it has an air dielectric rather than liquid, the two capacitors providing the compensating action mentioned above.

Connected between a tap 20 on the upper section of secondary 12 and a tap 21 on the lower section thereof is a repeater bridge-balancing potentiometer 22, a point on the potentiometer being connected to the center tap of the secondary whereby a voltage $V_4$ having the same phase angle as voltage $V_1$ is established across the potentiometer.

Resistor 14 is connected between the wiper arm 23 of potentiometer 22 and the node terminal 15, while resistor 13 is connected between wiper arm 19 of potentiometer 17 and the node terminal. Current flow through resistor 13 is represented by value $i_m$ and through resistor 14 by value $i_r$.

An amplifier 24 is connected between node terminal 15 and ground and is responsive to current flow resulting from unbalance of the bridge, the output of the amplifier being coupled to a servo system so as to effect rebalance of the master and repeater sections of the bridge.

The practical bridge circuit

The practical bridge circuit shown in Fig. 2 is similar to the basic circuit shown in Fig. 1 but with the addition of servo components and potentiometers for adjusting the bridge for any unbalances caused by the tank unit or compensating unit and by manufacturing tolerances, and current limiting resistors, $r$.

An empty adjustment potentiometer 25 is interposed between tank unit $C_T$ and voltage source $V_1$ to vary this voltage value as required. A full adjustment for the master rebalancing potentiometer is effected by a potentiometer 26 interposed between one end of potentiometer 17 and voltage point $V_3$. Similarly, a full adjustment potentiometer 27 is interposed between one end of the repeater rebalancing potentiometer 22 and voltage point $V_4$.

The output of amplifier 24 is connected to a pair of two-phase servo motors 28 and 29 having control windings 28a and 29a and reference windings 28b and 29b, respectively. The control windings 28a and 29a are shown as serially connected to the output of amplifier 24 but they may be connected in parallel. The reference winding 28b is connected to a voltage source $V_x$ having the phase of voltage $V_1$ through a condenser 30 whereby the voltage applied to this winding is displaced 90° in phase relative to voltage $V_1$. Reference winding 29b is connected directly to a voltage source $V_y$ having the phase of voltage $V_1$.

Servo motor 28 is operatively coupled to the wiper 23 of the repeater rebalancing potentiometer 22 and is mechanically linked to a suitably calibrated repeater indicator 32. In a like manner servo motor 29 is operatively coupled to the master rebalancing potentiometer 17 and is mechanically linked to a master indicator 33. The arrangement is such that both indicators, while driven independently of each other, afford identical readings.

The two-phase servo motors provide a phase discrimination action with reference to the output signal from the amplifier such that the master indicator 33 will be affected only by the imaginary component of the signal and the repeater indicator 32 will respond only to the real component of the signal.

As will be explained below, the system acts automatically to restore balance of the bridge for varying liquid levels in the tank, as reflected in the changing capacitance of the tank unit. The settings of the wiper arms 19 and 23 of the rebalancing potentiometers are representative of the quantity of the liquid in the tank, these settings being indicated by the master and repeater indicators.

Operation of gauge and repeater system

As is evident from the foregoing, the current values $i_T$, $i_R$, $i_c$, $i_e$, $i_m$, $i_r$ are electrically summed at node terminal 15. The current value $i_T$ is determined by the reactance of the unit $C_T$ and has a phase angle which is displaced 90° relative to voltage $V_1$. The values $i_R$, $i_c$ and $i_e$ are determined by the respective reactances of capacitors $C_R$, $C_c$ and $C_e$ and have a phase angle of 270° relative to $V_1$, for they are connected in the lower half of secondary 12 whose output is shifted 180° in phase from $V_1$, to which is added the 90° phase shift introduced by the capacitors.

The value $i_m$ is determined by resistor 13 connected to potentiometer 17 ($V_3$) and has a phase angle 180° relative to voltage $V_1$. The current value $i_r$, determined by resistor 14 which preferably matches resistor 13, is of the same phase angle as $V_1$ since it is connected to potentiometer 22 ($V_4$).

The sum of the currents at node terminal 15 and at the amplifier node must equal zero when the bridge is balanced.

Therefore:

$$i_T + i_R + i_c + i_e + i_m + i_r = 0 \qquad (1)$$

which also can be written $$j\omega V_1 C_T - j\omega V_3 \alpha (C_R + C_c) - j\omega V_2 C_e - \frac{\alpha V_3}{R} + \frac{\beta V_3}{R} = 0 \qquad (2)$$

Where:
$C_T$ = the capacitance of tank unit.
$C_e$ = the capacitance of empty balance capacitor.
$C_R$ = the capacitance of reference capacitor.
$C_c$ = the capacitance of fully wetted compensating capacitor.
$R$ = the resistance of each of the matched precision resistors 13 and 14.
$\omega = 2\pi x$ frequency.
$\alpha$ = the ratio of the resistance between arm (19) and voltage source $V_3$ and the resistance between ground (3) and voltage source $V_3$.
$\beta$ = ratio of the resistance between wiper arm 23 and voltage source $V_4$ and the resistance between ground and $V_4$.

$V_4$ is of such a value as to be equal and opposite in phase to $V_3$. In order for balance to exist, the real and imaginary terms must each sum to 0.

Therefore, two equations evolve:

$$j\omega V_1 C_T - j\omega \alpha V_3 (C_R + C_c) - j\omega V_2 C_e = 0 \qquad (3)$$

which can be written as $$V_1 C_T = V_2 C_e + \alpha V_3 (C_R + C_c) \qquad (4)$$

also $$\frac{\beta V_3}{R} = \frac{\alpha V_3}{R} \qquad (5)$$

hence, $$\alpha = \beta \qquad (6)$$

The value $C_T$ may be considered to be equal to the empty capacitance of the tank unit plus the volume of the fraction of the height of the unit that is covered with liquid multiplied by the empty capacitance of the tank unit and the dielectric constant of the fluid minus 1.

Thus, in equation form:

$$C_T = C_e + Q C_e (k-1) \qquad (7)$$

where $Q$ = volume of liquid in which the tank unit is immersed, and
$k$ = the dielectric constant of the liquid.

Substituting (7) into (4) gives:

$$V_1 C_e + V_1 Q C_e (k-1) = V_2 C_e + \alpha V_3 (C_R + C_c) \qquad (8)$$

Since $V_2 C_e$ was designed to produce a current equal to that of the tank unit when empty, $V_1 C_e$, these terms cancel in Equation 8. Thus, $\alpha V_3 (C_R + C_c)$ can be chosen to be a value equal to the current produced by $V_1 Q C_e (k-1)$.

The Equation 4 is for a standard fuel quantity gauge system, which is in equilibrium when the master rebalance potentiometer 17 is in such a position so as to balance the change in current caused by a change in fuel level in the tank unit, which position is an indication of fuel quantity.

Equation 6 is the basis of the repeater indication, since in order for the equation to be satisfied the repeater bridge must be in correspondence with the master bridge.

The master and repeater system, shown in Fig. 2, operates in the following manner.

The tank unit $C_T$ in the upper branch of the master bridge causes a current $i_T$ having a phase angle of 90° to flow to node terminal 15. When the bridge is in equilibrium the current $i_T$ is balanced by the resultant of currents, $i_R$, $i_c$ and $i_e$ having a phase angle of 270°. A change of level within the tank unit will create an unbalance current to appear at the node terminal 15 and a signal whose phase is either 90° or 270° relative to $V_1$ will be developed at the node terminal. After amplification this signal will flow through the control winding 29a of the master servo.

A torque will be produced by servo motor 29 only by a control voltage in phase quadrature with reference to winding 29b which is supplied by a voltage $V_y$ of phase angle 0°. This control voltage will cause the motor to displace wiper arm 19 of the master rebalancing potentiometer in a direction and to an extent reducing the unbalance to null, the motor at the same time acting to set the master indicator 33.

Inasmuch as the position of wiper arm 19 is a function of the height of the liquid in the tank unit $C_T$ and is proportional to the mass of fluid within the tank measured, since the circuit provides for compensation for variations in the ratio of dielectric constant to density in the various fluids measured, the master indicator will indicate the mass of fluid in the tank.

Assuming that the repeater bridge section is in balance and the level in tank unit $C_T$ has changed, resulting in a new position of wiper arm 19, a new current $i_m$ will flow to node terminal 15 of a phase angle 180° which when amplified by amplifier 24 will flow through control winding 28a of the repeater servo. Motor 28 also produces a torque only when current in quadrature with its reference winding 28b flows through the control winding 28a. Winding 28b is supplied with a voltage of phase angle 90° as described above, and produces a torque in the motor which will reposition wiper arm 23 in a direction so as to reduce the unbalance in this bridge section to null. Since in the preferred embodiment resistors 13 and 14 are identical and $V_4$ is equal to $V_3$, the movement of the arm 23 will be identical to the movement of arm 19 and like readings will appear at repeater indicator 32 and master indicator 33.

Thus the system in accordance with the invention provides like reading at two distinct positions remote from the tank without duplication of tank units or amplifiers.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A liquid quantity gauge and repeater system comprising a first bridge circuit which provides a first current and a second bridge circuit which provides a second current, a transformer having a primary connected to an alternating-current reference phase source and a center-tapped secondary, the upper half of which provides voltage of a given phase and the lower half of which provides voltage of opposing phase, said first bridge circuit having an upper branch including a sensing capacitor immersed in a liquid to be measured connected between the upper half of said secondary and a node terminal, a lower branch including a master rebalancing potentiometer effectively shunted across said lower half of said secondary and a reference capacitor connected between the wiper of said master potentiometer and said node terminal, said second bridge circuit including an upper branch having a repeater rebalancing potentiometer effectively connected across said upper half of said secondary and a resistor connected between the wiper of said repeater potentiometer and said node terminal and a lower branch including a matching resistor connected between the wiper of said master potentiometer and said node terminal whereby the second current developed by said second circuit when unbalanced is in phase opposition to said reference phase, means coupled to said node terminal and responsive solely to said first current to adjust the wiper of said master potentiometer to effect rebalance of said first circuit, and means coupled to said node terminal and responsive solely to said second current to adjust the wiper of said repeater potentiometer to effect rebalance of said second circuit.

2. A system as set forth in claim 1 including a master indicator operatively linked to the wiper of said master potentiometer and a repeater indicator operatively linked to the wiper of said repeater potentiometer.

3. In a liquid quantity gauge and repeater system, a first bridge circuit which provides a first current and a second bridge circuit which provides a second current, a transformer having a primary connected to an alternating-current reference phase source and a center-tapped secondary the upper half of which provides voltage of a given phase and the lower half of which provides voltage of opposing phase, said first bridge circuit having an upper branch including a sensing capacitor immersed in a liquid to be measured connected between the upper half of said secondary and a node terminal, a lower branch including a master rebalancing potentiometer effectively shunted across said lower half of said secondary and a reference capacitor connected between the wiper of said master potentiometer and said node terminal, said second bridge circuit including an upper branch having a repeater rebalancing potentiometer effectively connected across said upper half of said secondary and having a wiper and a resistor connected between the wiper of said repeater potentiometer and said node terminal and a lower branch including a matching resistor connected between the wiper of said master potentiometer and said node terminal whereby the second current developed by said second circuit when unbalanced is in phase opposition to said reference phase.

4. A liquid quantity gauge and repeater system comprising a first bridge circuit which provides a first current and a second bridge circuit which provides a second current, a transformer having a primary connected to an alternating-current reference phase source and a center-tapped secondary the upper half of which provides voltage of a given phase and the lower half of which provides voltage of opposing phase, said first bridge circuit having an upper branch including a sensing capacitor immersed in a liquid to be measured connected between the upper half of said secondary and a node terminal, a lower branch including a master rebalancing potentiometer effectively shunted across lower half of said secondary and a reference capacitor connected between the wiper of said potentiometer and said node terminal, said second bridge circuit including an upper branch having a repeater rebalancing potentiometer effectively connected across said upper half of said secondary and a resistor connected between the wiper of said repeater potentiometer and said node terminal and a lower branch including a matching resistor connected between the wiper of said master potentiometer and said node terminal whereby the second current developed by said second circuit when unbalanced is in phase opposition to said reference phase, and first and second two-phase servo motors operatively coupled to the respective wipers and including a control winding and a reference winding, the control windings being both connected to said node terminal and the reference windings being connected, respectively, to a first current source coincident in phase with said reference current and a second current source in phase quadrature therewith.

5. A liquid quantity gauge and repeater system comprising a capacitance bridge circuit and a resistance bridge circuit, both of said circuits being provided with a reference current source, said capacitance bridge circuit and said resistance bridge circuit having a common node terminal, a sensing capacitor immersed in the liquid to be measured, said capacitance bridge circuit and said resistance bridge circuit yielding first and second currents respectively, said first current having a value which varies in accordance with changes in said sensing capacitor in response to variations in the quantity of said liquid to be measured, said first current having a phase which is in quadrature relative to said second current, said second current having a phase which is in opposition to a reference current from said source, master indicating and rebalancing means responsive solely to said first current to effect rebalance of said capacitance bridge circuit thereby to indicate the liquid quantity, circuit means in said resistance bridge circuit to vary said second current in proportion to the rebalancing of said capacitance bridge circuit, and repeater indicating and rebalancing means responsive solely to said second current to effect rebalance of said resistance bridge circuit likewise to indicate liquid quantity whereby said repeater indicating means is controlled by said master indicating means.

6. A liquid quantity gauge and repeater system comprising a capacitance bridge circuit and a resistance bridge circuit, both of said circuits being provided with a reference current source, said capacitance bridge circuit and said resistance bridge circuit having a common node terminal, a sensing capacitor immersed in the liquid to be measured, a reference capacitor, said capacitance bridge circuit and said resistance bridge circuit yielding first and second currents respectively, said first current having a value which varies in accordance with the change in said sensing capacitor in response to variations in the quantity of the liquid to be measured, said first current having a phase which is in quadrature relative to said second current, said second current having a phase which is in opposition to a reference current from said source, master indicator means including a first servo motor responsive solely to said first current to effect rebalance of said capacitance bridge circuit thereby to indicate the liquid quantity, circuit means in said resistance bridge circuit to vary said second current in proportion to the rebalancing of said capacitance bridge circuit and repeater indicator means including a second servo motor responsive solely to said second current to effect rebalance of said resistance bridge circuit likewise to indicate liquid quantity, whereby said repeater indicator means is controlled by said master indicator means.

7. A liquid quantity gauge and repeater system comprising a capacitance bridge circuit provided with a sensing capacitor immersed in a liquid to be measured and a resistance bridge circuit, said capacitance bridge circuit and said resistance bridge circuit having a common node terminal and being provided with a reference current source, said capacitance bridge circuit and said resistance bridge circuit yielding first and second currents respectively, said first current having a value which varies with the change in said sensing capacitor in response to variations in the quantity of liquid to be measured, said first current having a phase which is in quadrature relative to said second current, said second current having a phase which is in opposition to a reference current from said source, first means to rebalance said capacitance bridge circuit, circuit means in said resistance bridge circuit to vary said second current in proportion to the rebalancing of said capacitance bridge circuit, second means to rebalance said resistance bridge circuit, first and second two-phase servo motors each having a reference winding and a control winding, said first motor being operatively coupled to said first rebalancing means, said second motor being operatively coupled to said second rebalancing means, means to apply a current to the reference winding of the first motor in phase coincidence with said reference current, means to apply a current to the reference winding of the second motor in phase quadrature with said reference current, and means coupling said node terminal to said control windings whereby said second motor is responsive to the operation of the first motor.

References Cited in the file of this patent

UNITED STATES PATENTS

| | | |
|---|---|---|
| 2,440,200 | Jofeh | Apr. 20, 1948 |
| 2,639,411 | Schafer | May 19, 1953 |
| 2,838,933 | Williamson | June 17, 1958 |